(12) United States Patent
Hsu et al.

(10) Patent No.: US 7,046,608 B2
(45) Date of Patent: May 16, 2006

(54) METHOD FOR CORRECTING DISC TYPE DETERMINATION

(75) Inventors: Jen-Yu Hsu, Taipei (TW); Hsiang-Yi Fu, Taipei (TW); Tun-Chieh Lee, Taipei (TW); Fu-Hsiang Chen, Taipei (TW); Yao-Chou Tsai, Taipei (TW)

(73) Assignee: Lite-On It Corporation, Taipei (TW)

( * ) Notice: Subject to any disclaimer, the term of this patent is extended or adjusted under 35 U.S.C. 154(b) by 236 days.

(21) Appl. No.: 10/746,178

(22) Filed: Dec. 24, 2003

(65) Prior Publication Data
US 2004/0136296 A1     Jul. 15, 2004

(30) Foreign Application Priority Data
Dec. 26, 2002  (TW) .............................. 91137451 A

(51) Int. Cl.
*G11B 20/18* (2006.01)

(52) U.S. Cl. ................................ 369/53.23; 369/53.35
(58) Field of Classification Search .................... None
See application file for complete search history.

(56) References Cited

U.S. PATENT DOCUMENTS

| 5,724,326 | A  | * | 3/1998  | Komazaki ................ 369/44.29 |
| 6,137,758 | A  | * | 10/2000 | Nemoto ................... 369/53.23 |
| 6,822,936 | B1 | * | 11/2004 | Ono et al. ............... 369/53.23 |

* cited by examiner

*Primary Examiner*—Thang V. Tran
(74) *Attorney, Agent, or Firm*—Thomas, Kayden, Horstemeyer & Risley

(57) ABSTRACT

A method for correcting disc type determination is disclosed. The method detects a tracking error signal, and verifies accuracy of a disc type determination according thereto.

3 Claims, 6 Drawing Sheets

METHOD FOR CORRECTING DISC TYPE DETERMINATION

BACKGROUND OF THE INVENTION

1. Field of the Invention

The present invention relates to a method for correcting disc type determination, and in particular to a method that corrects erroneous disc type determination immediately.

2. Description of the Related Art

To quickly read information stored on a disc, optical storage devices must determine disc type quickly and precisely to allow the pickup head to commence reading.

When a disc is inserted into an optical storage device, focusing servo adjusts the focus position of a pickup head and determines the disc type preliminary. Before the operation of 'track on' is executed by the tracking servo, a tracking error signal is detected and thereafter normalized. The normalization multiplies the tracking error signal by an appropriate gain to produce a normalized tracking error signal to be processed in subsequent calculation. After the normalization, the optical storage device begins to read the disc with a CD laser beam for CD or a DVD laser beam for DVD. Conventionally, the optical storage device discovers errors in disc type determination when the pickup head cannot read the information stored in the disc. Thereafter the optical storage devices will try different setting modules to make sure the errors (i.e. trial and error method).

However, this conventional method discovers errors belatedly, wasting much time in correcting the mistake.

SUMMARY OF THE INVENTION

Thus, there is a need for a more effective method for correcting disc type determination. The method of the present invention detects a tracking error signal and accuracy of the disc type determination according to the amplitude of the tracking error signal.

The present invention detects erroneous disc type determination immediately and corrects the disc determination in an effective way.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

When a disc is inserted into an optical storage device, the optical storage device performs focusing and tracking. In the focusing process, a pickup head nears the disk, projects laser beams onto the disk, and receives reflected laser beams from the disk. Thus, the disk type can be identified by the focused locations of the laser beams on the disk. Then, before the tracking process (i.e. track on), the optical storage device detects and multiplies a tracking error signal with a gain to normalize the tracking error signal.

Figure 5:
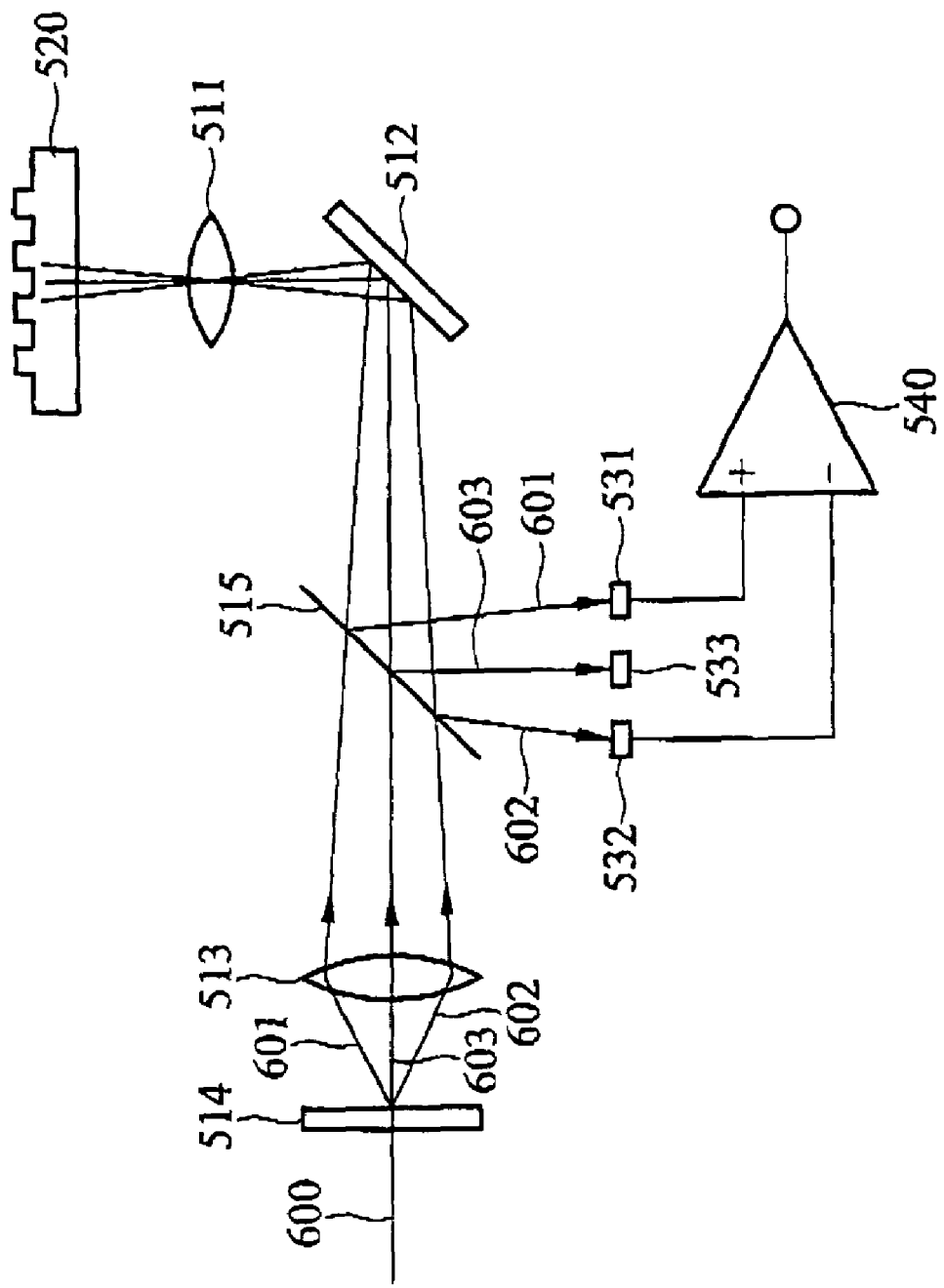
FIG. 5 is a schematic diagram of a tracking error detection system.
Figure 6A:
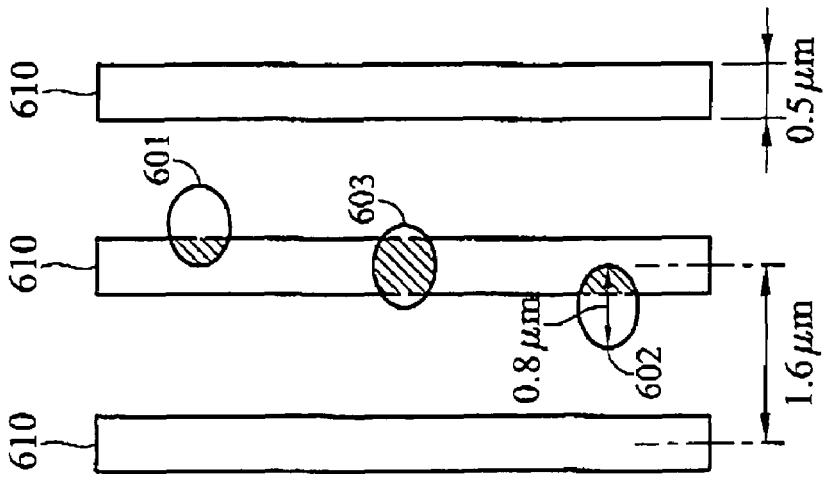
FIG. 6a shows CD laser beams precisely incident on a track of a CD.
Figure 6B:
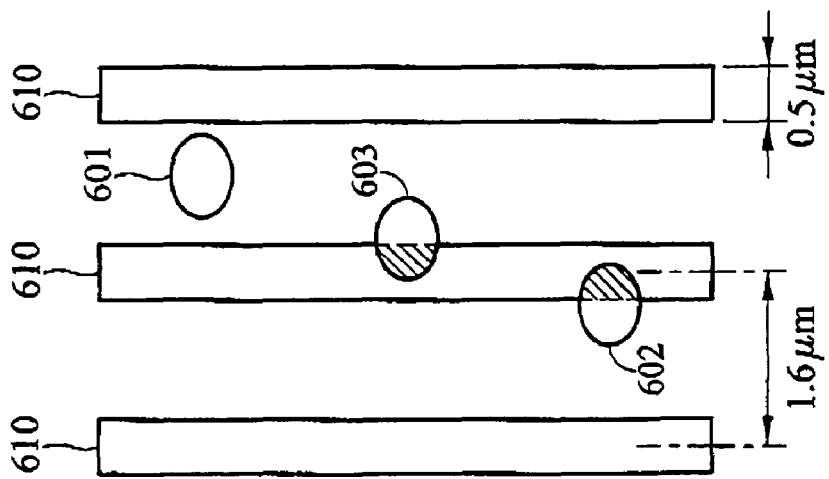
FIG. 6b shows CD laser beams imprecisely incident on a track of a CD.
Figure 6C:
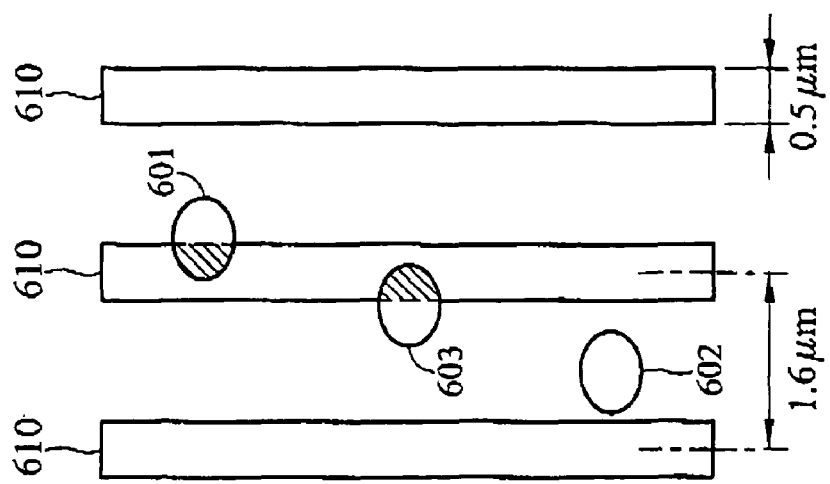
FIG. 6c shows CD laser beams imprecisely incident on a track of a CD.

FIG. 5 shows a tracking error signal detection system. A light beam 600 is split into three beams 601, 602 and 603 by a diffractometer 514. The three beams 601, 602 and 603 are reflected by a reflector 512, then pass through a condenser lens 511, and reach the disc 520. The disc 520 reflects the three beams 601, 602 and 603 through the condenser lens 511, are reflected by the reflector 512, split by the beam splitter 515, to contact the optical sensors 531, 532, and 533 respectively. As shown in FIG. 6a, when the beams 601, 602 and 603 are irradiated on the disc, the beams 601 and 602 are for tracking (i.e. detected as the tracking error signal); while the beam 603 is for focusing and reproducing. Because the beam reflected from a track of the disc is weaker than that from a blank area thereof, when the beams 601, 602 and 603 are precisely incident on a track 610, the beams 601 and 602 contact the track 610 with the same contact area. Thus, optical sensors 531 and 532 receive the same amount of light from the reflected beams 601 and 602. The voltage signals output from the optical sensors 531 and 532 are the same. A differential amplifier 540 subtracts the voltage signal from the optical sensor 531 by the voltage signal from the optical sensor 532 and produces a tracking error signal with amplitude of zero. As shown in FIGS. 6b and 6c, when the beams 601 and 602 are imprecisely incident on the track 610, the beams 601 and 602 contact the track 610 with different contact areas. The optical sensors 531 and 532 receive unequal amounts of light and output different voltage signals. The differential amplifier 540 subtracts the voltage signal of the optical sensor 531 from the voltage signal of the optical sensor 532, producing a tracking error signal with positive or negative amplitude.

Figure 1:
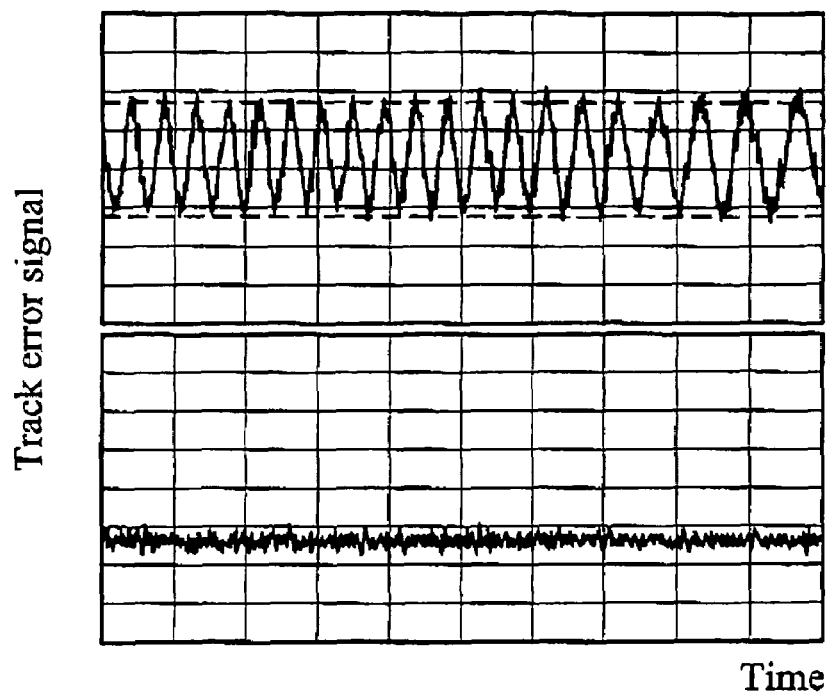
FIG. 1 shows the tracking error signal produced by detection of a CD by a CD laser beam.

When the disc type determination in the focusing process is correct, the pickup head detects the disc with its corresponding light beam. For example, as shown in FIG. 1, when the pickup head detects a CD with a CD laser beam, the differential amplifier produces a sinusoidal wave signal. While as shown in FIG. 2, when the pickup head detects a DVD with a DVD laser beam, the differential amplifier produces a triangular wave signal.

Figure 3:
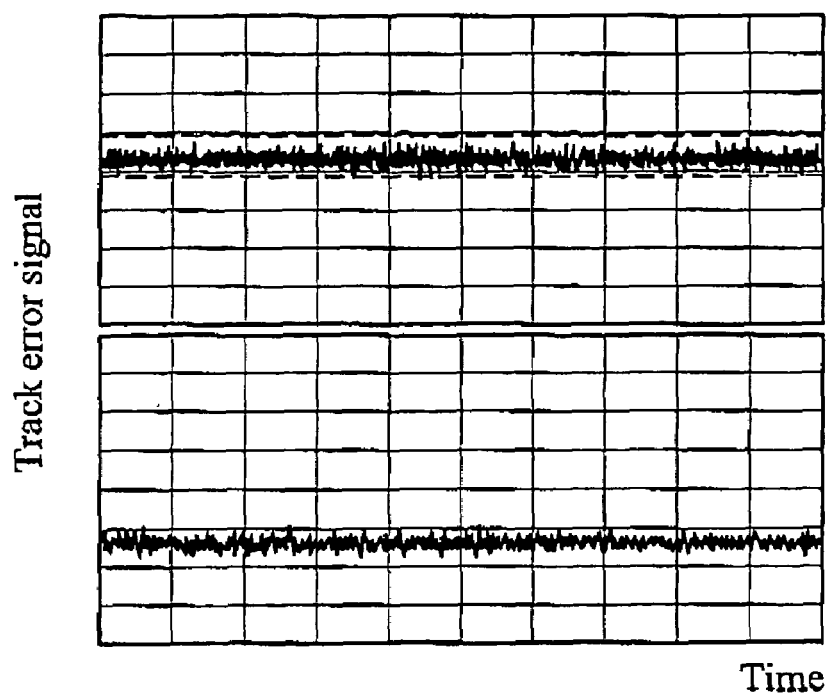
FIG. 3 shows the track error signal produced by detection of a DVD by a CD laser beam.
Figure 4:
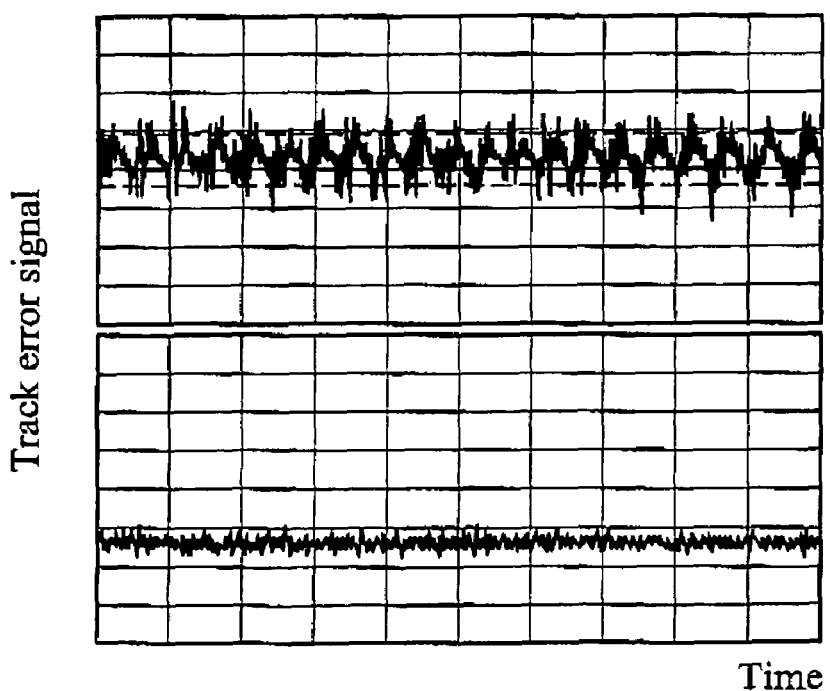
FIG. 4 shows the tracking error signal produced by detection of a CD by a DVD laser beam.

When the disc type determination in the focusing process is incorrect, the differential amplifier produces an abnormal tracking error signal. As shown in FIG. 3, when the pickup head detects a CD with a DVD laser beam, the amplitude of the tracking error signal is approximate to zero. As shown in FIG. 4, when the pickup head detects a DVD with a CD laser beam, the tracking error signal has a smaller amplitude than that produced when the pickup head detects a DVD with a DVD laser beam.

Figure 2:
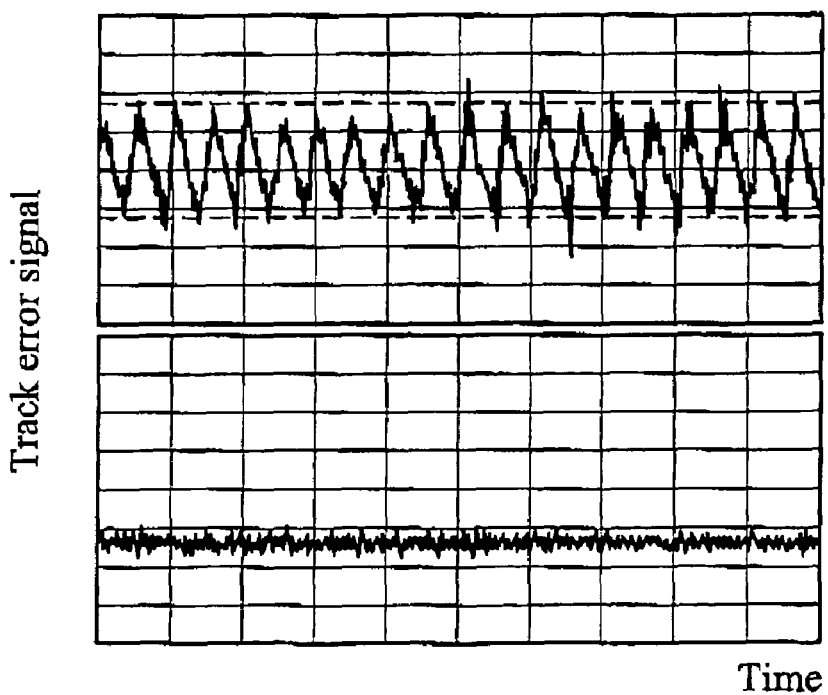
FIG. 2 shows the tracking error signal produced by detection of a DVD by a DVD laser beam.
Figure 7C:
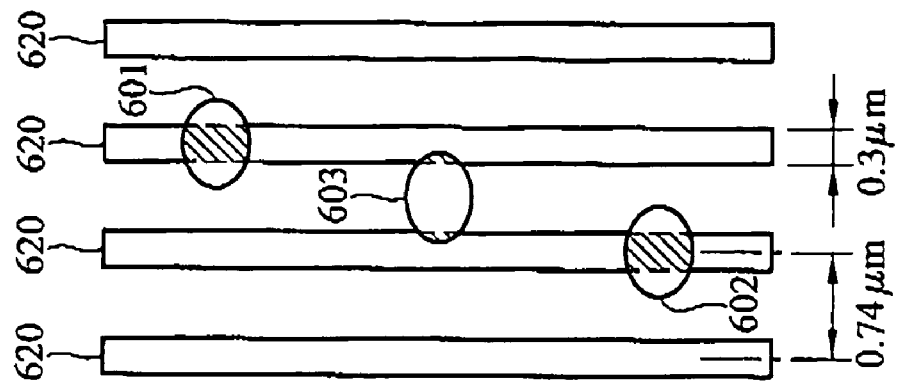
FIG. 7a, 7b and 7c show a process of detecting a DVD with a CD laser beam.
Figure 7B:
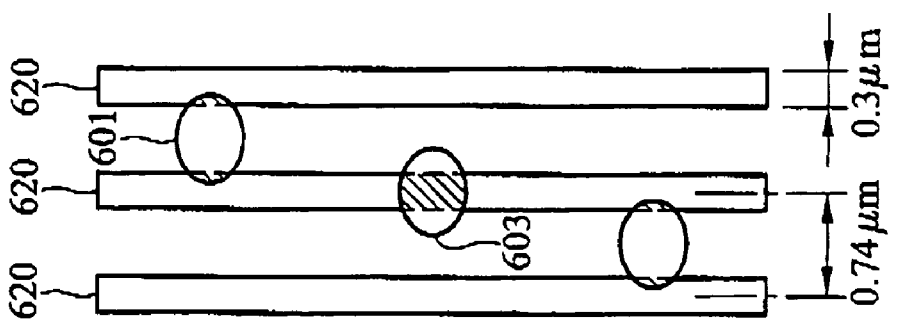
Figure 7A:
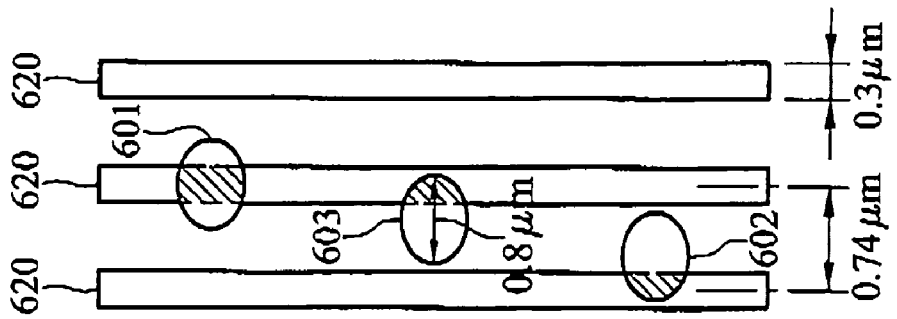
Figure 8:
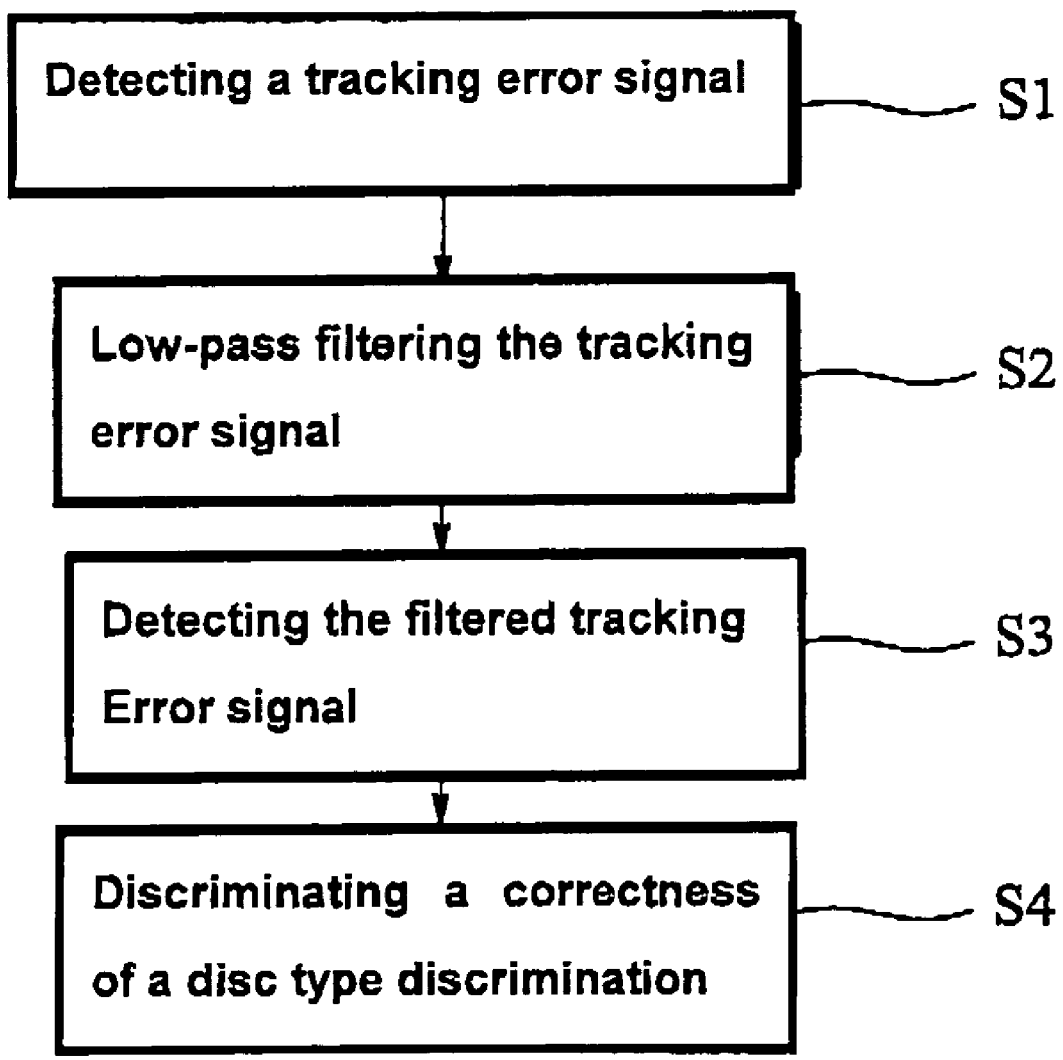
FIG. 8 is a flowchart of the present invention.

FIGS. 1, 2, 3 and 4 mentioned above share the same scale along the horizontal and vertical axes. The amplitude of the tracking error signal in FIG. 1 is about 1.47V. The amplitude of the tracking error signal in FIG. 2 is about 1.31V. The amplitude of the tracking error signal in FIG. 3 is about 0.53V. The amplitude of the tracking error signal in FIG. 4 is about 0.64V. Thus, the above values can take as reference values to confirm the accuracy of the disc type determination. For an example, the amplitude of the tracking error signal is approximate to zero when the pickup head detects a DVD with a CD laser beam as shown in FIG. 3 is due to the diameter of a CD laser beam (about 0.8 μm) exceeding a track pitch of a DVD. Thus, as shown in FIGS. 7a, 7b and 7c, when the track 620 slips, the beams 601 and 602 have the same contact area contacting the tracks 620 at any time. When the optical storage device performs tracking, the beams 601 and 602 have the same reflective brightness, the optical sensor 531 and 532 receive the same amount of light, and the differential amplifier produces tracking error signal with almost zero amplitude. That is, the amplitude of the tracking error signal is smaller than a regular threshold value, the inserted disc can be recognized as a DVD. Before the servo system entering the tracking process, the optical storage device usually normalizes the tracking error signal to correct the beforehand variation (to support various discs) and also for subsequent calculation. The normalization steps are low-pass filtering of the tracking error signal and multiplying by a gain. The time for normalization process should be limited to a certain extent.

If the amplitude of the tracking error signal is quite small, the low-pass filtered signal is also. Thus comparing the low-pass filtered signal with a reference threshold, the optical storage device can identifies whether there is an erroneous determination. In other words, if the low-pass filtered signal is less than the reference threshold, the disc type determination is incorrect.

As well, comparing a real gain produced in the normalization with an upper threshold gain, the optical storage device also identifies whether there has been an erroneous determination. If the real gain value exceeds the upper threshold gain too much, the disc type determination is incorrect.

The tracking error signal with tiny amplitude has to multiply the gain repeatedly when normalization. Thus if the normalization time is too long, the optical storage device also determines whether there has been an erroneous disc type determination.

FIG. 7 is a flowchart of the present invention. The optical storage device detects the tracking error signal (S1), low-pass filters the tracking error signal, detects the accuracy of the low-pass filtered signal, and identifies whether there has been an erroneous disc type determination.

In conclusion, the present invention provides effective identification of erroneous disc type determination immediately and corrects the mistake.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for correcting a disc type determination, comprising the steps of:
    detecting a tracking error signal;
    performing a low-pass filtering operation of the tracking error signal and producing a low-pass filtered signal.
    comparing the low-pass filtered signal with a predetermined threshold; and
    verifying inaccuracy of a disc type determination if the low-pass filtered signal is less than the predetermined threshold.

2. A method for correcting a disc type determination, comprising:
    performing a low-pass filtering operation on a tracking error signal and producing a low-pass filtered signal;
    producing a real gain for the low-pass filtered signal in a normalization;
    comparing the real gain with a predetermined gain threshold; and
    verifying inaccuracy of a disc type determination if the real gain exceeds the predetermined gain threshold.

3. A method for correcting a disc type determination, comprising:
    performing a low-pass filtering operation on a tracking error signal and producing a low-pass filtered signal;
    producing a real gain for the low-pass filtered signal in a normalization; and
    verifying inaccuracy of a disc type determination if a time of the normalization exceeds a predetermined limit.

* * * * *